(12) United States Patent
Raney et al.

(10) Patent No.: US 8,664,167 B2
(45) Date of Patent: *Mar. 4, 2014

(54) METHOD AND COMPOSITION FOR ENHANCED HYDROCARBONS RECOVERY

(75) Inventors: Kirk Herbert Raney, Houston, TX (US); Thomas Carl Semple, Friendswood, TX (US)

(73) Assignee: Shell Oil Company, Houston, TX (US)

( * ) Notice: Subject to any disclaimer, the term of this patent is extended or adjusted under 35 U.S.C. 154(b) by 569 days.

This patent is subject to a terminal disclaimer.

(21) Appl. No.: 12/866,245

(22) PCT Filed: Feb. 6, 2009

(86) PCT No.: PCT/US2009/033345
§ 371 (c)(1),
(2), (4) Date: Oct. 7, 2010

(87) PCT Pub. No.: WO2009/100301
PCT Pub. Date: Aug. 13, 2009

(65) Prior Publication Data
US 2011/0021389 A1 Jan. 27, 2011

Related U.S. Application Data

(60) Provisional application No. 61/026,926, filed on Feb. 7, 2008, provisional application No. 61/026,944, filed on Feb. 7, 2008.

(51) Int. Cl.
*C09K 8/584* (2006.01)
(52) U.S. Cl.
USPC .......................................... 507/255; 507/252
(58) Field of Classification Search
USPC ................................. 507/255, 252
See application file for complete search history.

(56) References Cited

U.S. PATENT DOCUMENTS

| | | | |
|---|---|---|---|
| 3,808,157 A | 4/1974 | Dewitt et al. | 252/555 |
| 3,943,160 A | 3/1976 | Farmer, III et al. | 260/458 |
| 3,946,812 A | 3/1976 | Gale et al. | 166/274 |
| 4,008,768 A | 2/1977 | Birk | 166/274 |
| 4,029,608 A | 6/1977 | Murata et al. | 252/551 |
| 4,077,471 A | 3/1978 | Shupe et al. | 166/275 |
| 4,098,818 A | 7/1978 | Krummel et al. | 260/535 R |
| 4,216,079 A | 8/1980 | Newcombe | 208/188 |
| 4,293,428 A | 10/1981 | Gale et al. | 252/8.55 D |
| 4,488,976 A | 12/1984 | Dilgren et al. | 252/8.55 |
| 4,537,253 A | 8/1985 | Morita et al. | 166/274 |
| 4,597,879 A | 7/1986 | Morita et al. | 252/8.55 |
| 4,690,217 A | 9/1987 | Taggart et al. | 166/274 |
| 4,736,795 A | 4/1988 | Karas | 166/274 |
| 4,979,564 A | 12/1990 | Kalpakci et al. | 166/273 |
| 5,057,627 A | 10/1991 | Edwards | 568/618 |
| 5,059,719 A | 10/1991 | Edwards | 568/618 |
| 5,068,043 A | 11/1991 | Thigpen et al. | 252/855.4 |
| 5,078,916 A | 1/1992 | Kok et al. | 252/549 |
| 5,103,909 A | 4/1992 | Morgenthaler et al. | 166/288 |
| 5,199,490 A | 4/1993 | Surles et al. | 166/270 |
| 5,284,206 A | 2/1994 | Surles et al. | 166/270 |
| 5,311,943 A | 5/1994 | Wellington | 166/274 |
| 5,318,709 A | 6/1994 | Wuest et al. | 252/8.554 |
| 5,510,306 A | 4/1996 | Murray | 502/64 |
| 5,648,584 A | 7/1997 | Murray | 585/666 |
| 5,648,585 A | 7/1997 | Murray et al. | 585/671 |
| 5,654,261 A | 8/1997 | Smith | 507/269 |
| 5,723,423 A | 3/1998 | Van Slyke | 510/188 |
| 5,849,960 A | 12/1998 | Singleton et al. | 568/909 |
| 6,022,834 A | 2/2000 | Hsu et al. | 507/259 |
| 6,150,222 A | 11/2000 | Gardner et al. | 438/300 |
| 6,222,077 B1 | 4/2001 | Singleton | 568/909 |
| 6,269,881 B1 | 8/2001 | Chou et al. | 166/270.1 |
| 6,427,268 B1 | 8/2002 | Davis | 5/490 |
| 6,439,308 B1 | 8/2002 | Wang | 166/270 |
| 6,953,766 B2 | 10/2005 | Edwards | 502/208 |
| 6,977,236 B2 | 12/2005 | Eleveld et al. | 502/175 |
| 7,055,602 B2 | 6/2006 | Shpakoff et al. | 166/268 |
| 2005/0154238 A1* | 7/2005 | Edwards | 568/679 |

FOREIGN PATENT DOCUMENTS

| | | | |
|---|---|---|---|
| CA | 1249429 | 1/1989 | B21B 43/22 |
| EP | 3183 | 7/1979 | E21B 43/22 |
| EP | 64384 | 11/1982 | C07C 143/11 |
| GB | 2123882 | 2/1984 | E21B 43/22 |
| GB | 2135713 | 9/1984 | E21B 43/22 |
| GB | 2137676 | 10/1984 | E21B 43/22 |
| GB | 2138866 | 10/1984 | E21B 43/22 |
| GB | 2139270 | 11/1984 | E21B 43/22 |
| WO | 2004081342 | 9/2004 | |

\* cited by examiner

Primary Examiner — Nathan M Nutter

(57) ABSTRACT

A method of treating a hydrocarbon containing formation, comprising (a) providing a hydrocarbon recovery composition to at least a portion of the hydrocarbon containing formation, wherein the hydrocarbon recovery composition comprises a propoxylated composition which comprises (1) a glycerol sulfonate of a propoxylated primary alcohol having a branched aliphatic group with an average carbon number from 10 to 24 and having an average number of branches per aliphatic group of from 0.7 to 2.5 and having at least 0.5, preferably from 3 to 12, moles of propylene oxide per mole of primary alcohol and (2) polypropylene glycol; provided that the primary alcohol is propoxylated by contacting the alcohol with propylene oxide in the presence of a catalytically effective amount of one or more of the phosphate salts of lanthanum series elements or the rare earth elements, preferably a carbonate salt thereof, wherein the propoxylated composition comprising the propoxylated alcohol and from 1 to 30 wt % of polypropylene glycol is produced; and (b) allowing the composition to interact with hydrocarbons in the hydrocarbon containing formation.

15 Claims, 3 Drawing Sheets

METHOD AND COMPOSITION FOR ENHANCED HYDROCARBONS RECOVERY

PRIORITY CLAIM

The present application claims priority to U.S. Provisional Patent Application No. 61/026,926 filed 7 Feb. 2008 and U.S. Provisional Patent Application No. 61/026,944 filed 7 Feb. 2008.

FIELD OF THE INVENTION

The present invention generally relates to methods for recovery of hydrocarbons from hydrocarbon formations. More particularly, embodiments described herein relate to methods of enhanced hydrocarbons recovery and to compositions useful therein.

BACKGROUND OF THE INVENTION

Hydrocarbons may be recovered from hydrocarbon containing formations by penetrating the formation with one or more wells. Hydrocarbons may flow to the surface through the wells. Conditions (e.g., permeability, hydrocarbon concentration, porosity, temperature, pressure) of the hydrocarbon containing formation may affect the economic viability of hydrocarbon production from the hydrocarbon containing formation. A hydrocarbon containing formation may have natural energy (e.g., gas, water) to aid in mobilizing hydrocarbons to the surface of the hydrocarbon containing formation. Natural energy may be in the form of water. Water may exert pressure to mobilize hydrocarbons to one or more production wells. Gas may be present in the hydrocarbon containing formation at sufficient pressures to mobilize hydrocarbons to one or more production wells. The natural energy source may become depleted over time. Supplemental recovery processes may be used to continue recovery of hydrocarbons from the hydrocarbon containing formation. Examples of supplemental processes include waterflooding, polymer flooding, alkali flooding, thermal processes, solution flooding or combinations thereof.

In chemical Enhanced Oil Recovery (EOR) the mobilization of residual oil saturation is achieved through surfactants which generate a sufficiently (ultra) low crude oil/water interfacial tension (IFT) to give a capillary number large enough to overcome capillary forces and allow the oil to flow (I. Chatzis and N. R. Morrows, "Correlation of capillary number relationship for sandstone". SPE Journal, Vol 29, pp 555-562, 1989.) However, reservoirs have different characteristics (crude oil type, temperature and the water composition—salinity, hardness) and it is desirable that the structures of added surfactant(s) be matched to these conditions to achieve a low IFT. In addition, a promising surfactant must fulfill other important criteria including low rock retention, compatibility with polymer, thermal and hydrolytic stability and acceptable cost.

Compositions and methods for enhanced hydrocarbons recovery are described in U.S. Pat. No. 3,943,160 to Farmer et al., entitled "Heat-Stable Calcium-Compatible Waterflood Surfactant;" U.S. Pat. No. 3,946,812 to Gale et al., entitled "Use Of Materials As Waterflood Additives;" U.S. Pat. No. 4,077,471 to Shupe et al., entitled "Surfactant Oil Recovery Process Usable In High Temperature, High Salinity Formations;" U.S. Pat. No. 4,216,079 to Newcombe, entitled "Emulsion Breaking With Surfactant Recovery;" U.S. Pat. No. 5,318,709 to Wuest et al., entitled "Process for the Production of Surfactant Mixtures Based On Ether Sulfonated And Their Use;" U.S. Pat. No. 5,723,423 to Van Slyke, entitled "Solvent Soaps and Methods Employing Same;"U.S. Pat. No. 6,022,834 to Hsu et al., entitled "Alkaline Surfactant Polymer Flooding Composition and Process;" U.S. Pat. No. 6,269,881 to Chou et al., entitled "Oil Recovery Method For Waxy Crude Oil Using Alkylaryl Sulfonate Surfactants Derived From Alpha-Olefins and the Alpha-Olefin Compositions" and by Wellington, et al. in "Low Surfactant Concentration Enhanced Waterflooding," Society of Petroleum Engineers, 1995; all of which are incorporated by reference herein.

U.S. Pat. No. 7,055,602 describes enhanced hydrocarbons recovery compositions containing aliphatic nonionic additives and/or the aliphatic anionic surfactants that have branched structures. These additives and surfactants may be primary alcohols or sulfates thereof having branched aliphatic groups which may have an average carbon number from 10 to 24, less than about 0.5 percent quaternary carbon atoms, an average number of branches per aliphatic group of the aliphatic anionic surfactant may range between about 0.7 and about 2.5, and methyl branches may represent between about 20 percent to about 99 percent of the total number of branches present in the group. Such compositions are shown in Table of that patent to achieve interfacial tensions of from 0.0022 (low range) to 1.9040 (high range) dynes/cm when used alone or in combination with other materials.

SUMMARY OF THE INVENTION

The present invention provides a method of treating a hydrocarbon containing formation, comprising (a) providing a hydrocarbon recovery composition to at least a portion of the hydrocarbon containing formation, wherein the hydrocarbon recovery composition comprises a propoxylated composition which comprises (1) a glycerol sulfonate of a propoxylated primary alcohol having a branched aliphatic group with an average carbon number from 10 to 24 and having an average number of branches per aliphatic group of from about 0.7 to about 2.5 and having at least about 0.5, preferably from about 3 to about 12, moles of propylene oxide per mole of primary alcohol and (2) polypropylene glycol (which acts to enhance the ability of the glycerol sulfonate to lower the interfacial tension); provided that the primary alcohol is propoxylated by contacting the alcohol with propylene oxide in the presence of a catalytically effective amount of one or more of the phosphate salts of lanthanum series elements or the rare earth elements, preferably a carbonate salt thereof, wherein the propoxylated composition comprising the propoxylated alcohol and from 1 to 30 wt % of polypropylene glycol is produced; and (b) allowing the hydrocarbon recovery composition to interact with hydrocarbons in the hydrocarbon containing formation.

In one embodiment, the hydrocarbon recovery composition may include a glycerol sulfonate of a propoxylated primary alcohol having a branched aliphatic group with an average carbon number from 10 to 24 and having an average number of branches per aliphatic group of from about 0.7 to about 2.5. The glycerol sulfonate may have an average carbon number of at least 14 or it may range from 14 to 20. As used herein, the phrase "carbon number" refers to the total number of carbons in a molecule. The average carbon number may be determined by NMR analysis. The average number of branches per molecule of the branched glycerol sulfonate may be at least about 2 in some embodiments. Branches on the branched glycerol sulfonate may include, but are not limited to, methyl and/or ethyl branches. In some embodiments, the average number of branches per molecule may be at least about 1 and/or up to about 3 or up to about 6 or up to about 10. The average number of branches per molecule may also be determined by NMR analysis.

In one embodiment, the hydrocarbon recovery composition may include a glycerol sulfonate of an propoxylated branched primary alcohol having a branched aliphatic group with an average carbon number from 16 to 19, preferably 16 to 17, and having an average number of branches per aliphatic group of from about 0.7 to about 2.5, preferably about 1.4 to about 2. In one embodiment, methyl groups may represent from about 20 to about 99 percent of the total number of branches present in the branched aliphatic group.

In an embodiment, the hydrocarbon recovery composition may comprise from about 10 to about 80 wt % of the propoxylated composition, preferably from about 10 to about 40 wt % and more preferably from about 20 to about 30 wt %. In an embodiment, a hydrocarbon containing composition may be produced from a hydrocarbon containing formation. The hydrocarbon containing composition may include any combination of hydrocarbons, the derivatives described above, a solubilizing agent, methane, water, asphaltenes, carbon monoxide and ammonia.

In an embodiment, the hydrocarbon recovery composition is provided to the hydrocarbon containing formation by admixing it with water and/or brine which may be from the formation from which hydrocarbons are to be extracted. Preferably, the hydrocarbon recovery composition comprises from about 0.1 to about 4 wt % of the total water and/or brine/hydrocarbon recovery composition mixture (the injectable fluid). More important is the amount of actual active matter that is present in the injectable fluid (active matter is the surfactant, here the propoxylated composition). Thus, the amount of the propoxylated composition in the injectable fluid may be from about 0.1 to about 1 wt %, preferably from about 0.2 to about 0.5 wt %. The injectable fluid is then injected into the hydrocarbon containing formation.

In an embodiment, a hydrocarbon containing composition may be produced from a hydrocarbon containing formation. The hydrocarbon containing composition may include any combination of hydrocarbons, the glycerol sulfonate described above, a enhancing agent, methane, water, asphaltenes, carbon monoxide and ammonia.

BRIEF DESCRIPTION OF THE DRAWINGS

Advantages of the present invention will become apparent to those skilled in the art with the benefit of the following detailed description of embodiment and upon reference to the accompanying drawings, in which.

Figure 1:
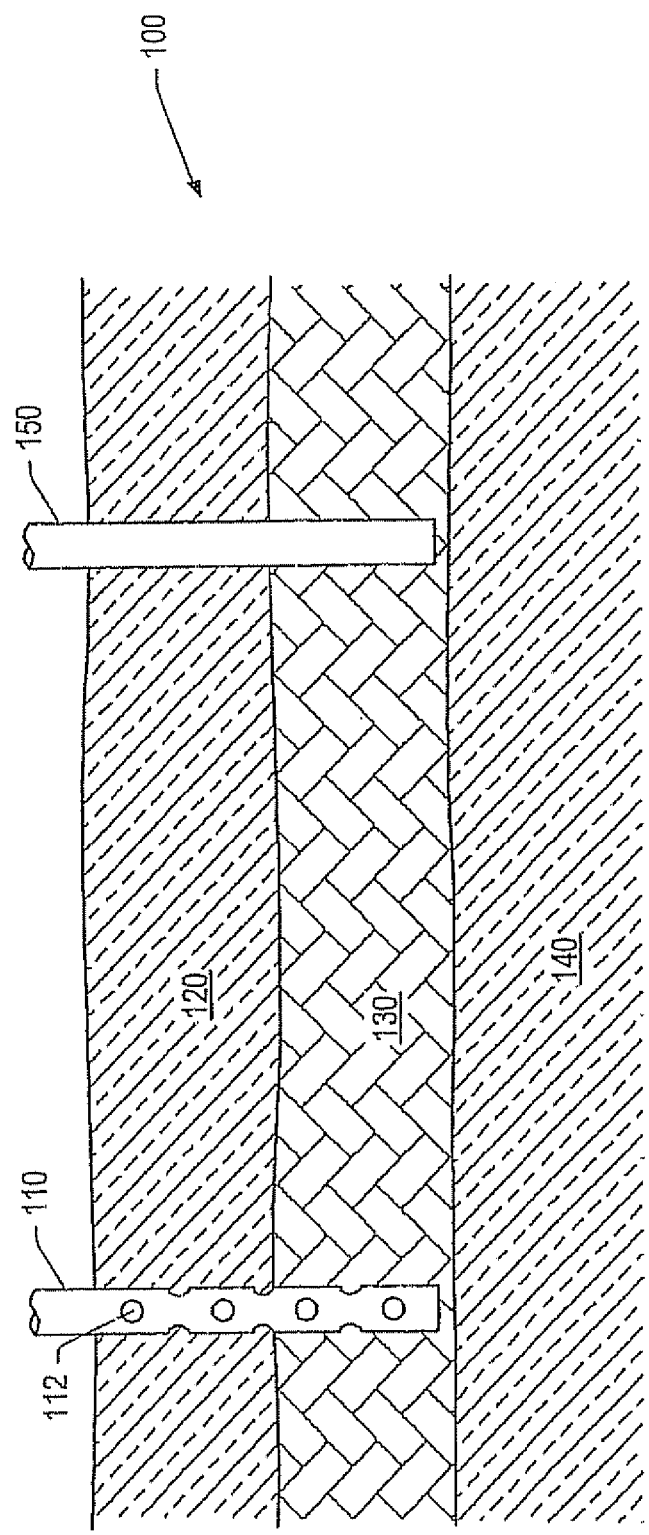
FIG. 1 depicts an embodiment of treating a hydrocarbon containing formation.

While the invention is susceptible to various modifications and alternative forms, specific embodiments thereof are shown by way of example in the drawings and will herein be described in detail. It should be understood that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Hydrocarbons may be produced from hydrocarbon formations through wells penetrating a hydrocarbon containing formation. "Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen and/or sulfur. Hydrocarbons derived from a hydrocarbon formation may include, but are not limited to, kerogen, bitumen, pyrobitumen, asphaltenes, oils or combinations thereof. Hydrocarbons may be located within or adjacent to mineral matrices within the earth. Matrices may include, but are not limited to, sedimentary rock, sands, silicilytes, carbonates, diatomites and other porous media.

A "formation" includes one or more hydrocarbon containing layers, one or more non-hydrocarbon layers, an overburden and/or an underburden. An "overburden" and/or an "underburden" includes one or more different types of impermeable materials. For example, overburden/underburden may include rock, shale, mudstone, or wet/tight carbonate (i.e., an impermeable carbonate without hydrocarbons). For example, an underburden may contain shale or mudstone. In some cases, the overburden/underburden may be somewhat permeable. For example, an underburden may be composed of a permeable mineral such as sandstone or limestone. In some embodiments, at least a portion of a hydrocarbon containing formation may exist at less than or more than 1000 feet below the earth's surface.

Properties of a hydrocarbon containing formation may affect how hydrocarbons flow through an underburden/overburden to one or more production wells. Properties include, but are not limited to, porosity, permeability, pore size distribution, surface area, salinity or temperature of formation. Overburden/underburden properties in combination with hydrocarbon properties, such as, capillary pressure (static) characteristics and relative permeability (flow) characteristics may effect mobilization of hydrocarbons through the hydrocarbon containing formation.

Permeability of a hydrocarbon containing formation may vary depending on the formation composition. A relatively permeable formation may include heavy hydrocarbons entrained in, for example, sand or carbonate. "Relatively permeable," as used herein, refers to formations or portions thereof, that have an average permeability of 10 millidarcy or more. "Relatively low permeability" as used herein, refers to formations or portions thereof that have an average permeability of less than about 10 millidarcy. One darcy is equal to about 0.99 square micrometers. An impermeable portion of a formation generally has a permeability of less than about 0.1 millidarcy. In some cases, a portion or all of a hydrocarbon portion of a relatively permeable formation may include predominantly heavy hydrocarbons and/or tar with no supporting mineral grain framework and only floating (or no) mineral matter (e.g., asphalt lakes).

Fluids (e.g., gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. In an embodiment, a first boundary may form between a water layer and underburden. A second boundary may form between a water layer and a hydrocarbon layer. A third boundary may form between hydrocarbons of different densities in a hydrocarbon containing formation. Multiple fluids with multiple boundaries may be present in a hydrocarbon containing formation, in some embodiments. It should be understood that many combinations of boundaries between fluids and between fluids and the overburden/underburden may be present in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult. Quantification of the interactions (e.g., energy level) at the interface of the fluids and/or fluids and overburden/underburden may be useful to predict mobilization of hydrocarbons through the hydrocarbon containing formation.

Quantification of energy required for interactions (e.g., mixing) between fluids within a formation at an interface may be difficult to measure. Quantification of energy levels at an interface between fluids may be determined by generally known techniques (e.g., spinning drop tensiometer). Interaction energy requirements at an interface may be referred to as interfacial tension. "Interfacial tension" as used herein, refers to a surface free energy that exists between two or more fluids that exhibit a boundary. A high interfacial tension value (e.g., greater than about 10 dynes/cm) may indicate the inability of one fluid to mix with a second fluid to form a fluid emulsion. As used herein, an "emulsion" refers to a dispersion of one immiscible fluid into a second fluid by addition of a composition that reduces the interfacial tension between the fluids to achieve stability. The inability of the fluids to mix may be due to high surface interaction energy between the two fluids. Low interfacial tension values (e.g., less than about 1 dyne/cm) may indicate less surface interaction between the two immiscible fluids. Less surface interaction energy between two immiscible fluids may result in the mixing of the two fluids to form an emulsion. Fluids with low interfacial tension values may be mobilized to a well bore due to reduced capillary forces and subsequently produced from a hydrocarbon containing formation.

Fluids in a hydrocarbon containing formation may wet (e.g., adhere to an overburden/underburden or spread onto an overburden/underburden in a hydrocarbon containing formation). As used herein, "wettability" refers to the preference of a fluid to spread on or adhere to a solid surface in a formation in the presence of other fluids. Methods to determine wettability of a hydrocarbon formation are described by Craig, Jr. in "The Reservoir Engineering Aspects of Waterflooding", 1971 Monograph Volume 3, Society of Petroleum Engineers, which is herein incorporated by reference. In an embodiment, hydrocarbons may adhere to sandstone in the presence of gas or water. An overburden/underburden that is substantially coated by hydrocarbons may be referred to as "oil wet." An overburden/underburden may be oil wet due to the presence of polar and/or heavy hydrocarbons (e.g., asphaltenes) in the hydrocarbon containing formation. Formation composition (e.g., silica, carbonate or clay) may determine the amount of adsorption of hydrocarbons on the surface of an overburden/underburden. In some embodiments, a porous and/or permeable formation may allow hydrocarbons to more easily wet the overburden/underburden. A substantially oil wet overburden/underburden may inhibit hydrocarbon production from the hydrocarbon containing formation. In certain embodiments, an oil wet portion of a hydrocarbon containing formation may be located at less than or more than 1000 feet below the earth's surface.

A hydrocarbon formation may include water. Water may interact with the surface of the underburden. As used herein, "water wet" refers to the formation of a coat of water on the surface of the overburden/underburden. A water wet overburden/underburden may enhance hydrocarbon production from the formation by preventing hydrocarbons from wetting the overburden/underburden. In certain embodiments, a water wet portion of a hydrocarbon containing formation may include minor amounts of polar and/or heavy hydrocarbons.

Water in a hydrocarbon containing formation may contain minerals (e.g., minerals containing barium, calcium, or magnesium) and mineral salts (e.g., sodium chloride, potassium chloride, magnesium chloride). Water salinity and/or water hardness of water in a formation may affect recovery of hydrocarbons in a hydrocarbon containing formation. As used herein "salinity" refers to an amount of dissolved solids in water. "Water hardness," as used herein, refers to a concentration of divalent ions (e.g., calcium, magnesium) in the water. Water salinity and hardness may be determined by generally known methods (e.g., conductivity, titration). As used herein, "high salinity water" refers to water that has greater than about 30,000 ppm total dissolved solids based on sodium chloride. As water salinity increases in a hydrocarbon containing formation, interfacial tensions between hydrocarbons and water may be increased and the fluids may become more difficult to produce.

Low salinity water in a hydrocarbon containing formation may enhance hydrocarbon production from a hydrocarbon containing formation. Hydrocarbons and low salinity water may form a well dispersed emulsion due to a low interfacial tension between the low salinity water and the hydrocarbons. Production of a flowable emulsion (e.g., hydrocarbons/water mixture) from a hydrocarbon containing formation may be more economically viable to a producer. As used herein, "low salinity water" refers to water salinity in a hydrocarbon containing formation that is less than about 20,000 parts per million (ppm) total dissolved solids based on sodium chloride. In some embodiments, hydrocarbon containing formations may include water with a salinity of less than about 13,000 ppm. In certain embodiments, hydrocarbon containing formations may include water with a salinity ranging from about 3,000 ppm to about 10,000 ppm. In other embodiments, salinity of the water in hydrocarbon containing formations may range from about 5,000 ppm to about 8,000 ppm.

A hydrocarbon containing formation may be selected for treatment based on factors such as, but not limited to, thickness of hydrocarbon containing layers within the formation, assessed liquid production content, location of the formation, salinity content of the formation, temperature of the formation, and depth of hydrocarbon containing layers. Initially, natural formation pressure and temperature may be sufficient to cause hydrocarbons to flow into well bores and out to the surface. Temperatures in a hydrocarbon containing formation may range from about 0° C. to about 300° C. As hydrocarbons are produced from a hydrocarbon containing formation, pressures and/or temperatures within the formation may decline. Various forms of artificial lift (e.g., pumps, gas injection) and/or heating may be employed to continue to produce hydrocarbons from the hydrocarbon containing formation. Production of desired hydrocarbons from the hydrocarbon containing formation may become uneconomical as hydrocarbons are depleted from the formation.

Mobilization of residual hydrocarbons retained in a hydrocarbon containing formation may be difficult due to viscosity of the hydrocarbons and capillary effects of fluids in pores of the hydrocarbon containing formation. As used herein "capillary forces" refers to attractive forces between fluids and at least a portion of the hydrocarbon containing formation. In an embodiment, capillary forces may be overcome by increasing the pressures within a hydrocarbon containing formation. In other embodiments, capillary forces may be overcome by reducing the interfacial tension between fluids in a hydrocarbon containing formation. The ability to reduce the capillary forces in a hydrocarbon containing formation may depend on a number of factors, including, but not limited to, the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (e.g., brine, steam), gases, polymers, monomers or any combinations thereof to the hydrocarbon formation to increase mobilization of hydrocarbons.

In an embodiment, a hydrocarbon containing formation may be treated with a flood of water. A waterflood may include injecting water into a portion of a hydrocarbon containing formation through injections wells. Flooding of at least a portion of the formation may water wet a portion of the hydrocarbon containing formation. The water wet portion of the hydrocarbon containing formation may be pressurized by known methods and a water/hydrocarbon mixture may be collected using one or more production wells. The water layer, however, may not mix with the hydrocarbon layer efficiently. Poor mixing efficiency may be due to a high interfacial tension between the water and hydrocarbons.

Production from a hydrocarbon containing formation may be enhanced by treating the hydrocarbon containing formation with a polymer and/or monomer that may mobilize hydrocarbons to one or more production wells. The polymer and/or monomer may reduce the mobility of the water phase in pores of the hydrocarbon containing formation. The reduction of water mobility may allow the hydrocarbons to be more easily mobilized through the hydrocarbon containing formation. Polymers include, but are not limited to, polyacrylamides, partially hydrolyzed polyacrylamide, polyacrylates, ethylenic copolymers, biopolymers, carboxymethylcellulose, polyvinyl alcohol, polystyrene sulfonates, polyvinylpyrrolidone, AMPS (2-acrylamide-2-methyl propane sulfonate) or combinations thereof. Examples of ethylenic copolymers include copolymers of acrylic acid and acrylamide, acrylic acid and lauryl acrylate, lauryl acrylate and acrylamide. Examples of biopolymers include xanthan gum and guar gum. In some embodiments, polymers may be crosslinked in situ in a hydrocarbon containing formation. In other embodiments, polymers may be generated in situ in a hydrocarbon containing formation. Polymers and polymer preparations for use in oil recovery are described in U.S. Pat. No. 6,427,268 to Zhang et al., entitled "Method For Making Hydrophobically Associative Polymers, Methods of Use and Compositions;" U.S. Pat. No. 6,439,308 to Wang, entitled "Foam Drive Method;" U.S. Pat. No. 5,654,261 to Smith, entitled, "Permeability Modifying Composition For Use In Oil Recovery;" U.S. Pat. No. 5,284,206 to Surles et al., entitled "Formation Treating;" U.S. Pat. No. 5,199,490 to Surles et al., entitled "Formation Treating" and U.S. Pat. No. 5,103,909 to Morgenthaler et al., entitled "Profile Control In Enhanced Oil Recovery," all of which are incorporated by reference herein.

The Hydrocarbon Recovery Composition

This family of anionic surfactants based on these randomly branched alcohols is useful for use under higher salinity reservoir conditions. In this family the connecting group PO links the alcohol hydrophobe to the anionic sulfonate and is used to change the HLB of the molecule and match it to reservoir conditions in terms of salinity and crude oil. The presence of PO chains in the connecting group helps to provide tolerance to Ca, Mg ions in hard water.

In an embodiment, a hydrocarbon recovery composition may be provided to the hydrocarbon containing formation. In an embodiment, a composition may include a glycerol sulfonate of a propoxylated primary alcohol having a branched aliphatic group with an average carbon number from 10 to 24 and having an average number of branches per aliphatic group of from about 0.7 to about 2.5. The glycerol sulfonate may have an average carbon number of at least 14 or it may range from 14 to 20. In some embodiments, the average number of branches per molecule may be up to about 3 or up to about 6 or up to about 10.

In one embodiment, the hydrocarbon recovery composition may include a carboxylate or a sulfate or a glycerol sulfonate of an propoxylated branched primary alcohol having a branched aliphatic group with an average carbon number from 16 to 19, preferably 16 to 17, and having an average number of branches per aliphatic group of from about 0.7 to about 2.5, preferably about 1.4 to about 2.

Branched primary alcohols according to the present invention may be prepared by hydroformylation of a branched olefin. Preparations of branched olefins are described in U.S. Pat. No. 5,510,306 to Murray, entitled "Process For Isomerizing Linear Olefins to Isoolefins;" U.S. Pat. No. 5,648,584 to Murray, entitled "Process For Isomerizing Linear Olefins to Isoolefins" and U.S. Pat. No. 5,648,585 to Murray, entitled "Process For Isomerizing Linear Olefins to Isoolefins," all of which are incorporated by reference herein. Preparations of branched long chain aliphatic alcohols are described in U.S. Pat. No. 5,849,960 to Singleton et al., entitled "Highly Branched Primary Alcohol Compositions, and Biodegradable Detergents Made Therefrom;" U.S. Pat. No. 6,150,222 to Singleton et al., entitled "Highly Branched Primary Alcohol Compositions, and Biodegradable Detergents Made Therefrom;" U.S. Pat. No. 6, 222,077 to Singleton et al., entitled "Highly Branched Primary Alcohol Compositions, and Biodegradable Detergents Made Therefrom," all of which are incorporated by reference herein.

In some embodiments, the branches of the branched aliphatic group of the long chain primary alcohol may have less than about 0.5 percent aliphatic quaternary carbon atoms. In an embodiment, an average number of branches per long chain aliphatic alcohol ranges from about 0.1 to about 2.5. In other embodiments, an average number of branches per alcohol ranges from about 0.7 to about 2.5.

Methyl branches may represent between about 20 percent to about 99 percent of the total number of branches present in the branched long chain primary alcohol. In some embodiments, methyl branches may represent greater than about 50 percent of the total number of branches in a branched long chain primary alcohol. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl or methyl groups.

The amount of propylene oxide added to the primary alcohol may be at least about 0.5, preferably from about 3 to about 12, most preferably from about 5 to about 9, moles of propylene oxide per mole of primary alcohol. It is preferred that at least about 3 moles be utilized in order to minimize the amount of unalkoxylated secondary alcohol. It is preferred that no more than about 12 moles be used because the molecule loses its ability to function as a surfactant when the carbon chain on the alcohol portion is too short relative to the amount of propylene oxide in the molecule. In order for the molecule to function successfully as a surfactant in the hydrocarbon containing formation, there must be a proper balance between the length of the oil soluble carbon chain part of the molecule and the water soluble propylene oxide part of the molecule. The surfactant made according to this invention is a propoxylated composition produced which comprises the propoxylated alcohol and from about 1 to about 30 wt %, preferably from about 10 to about 20 wt %, most preferably about 13 to about 17 wt %, of polypropylene glycol.

In one embodiment, the hydrocarbon recovery composition may include the propoxylated composition as described above. In some embodiments, an amount of the propoxylated composition in the hydrocarbon recovery composition may be greater than about 10 wt. % of the total hydrocarbon recovery composition. In an embodiment, an amount of the propoxylated composition in the hydrocarbon recovery composition may range from about 10 wt. % to about 80 wt. % of the total composition. An amount of the propoxylated composition in the hydrocarbon recovery composition may range from about 10 wt % to about 40 wt % of the total weight of the hydrocarbon recovery composition, preferably from about 20 to about 30 wt %. The remainder of the hydrocarbon recovery composition may include, but is not limited to, water, low molecular weight alcohols, organic solvents, alkyl sulfonates, aryl sulfonates, brine or combinations thereof. Low molecular weight alcohols include, but are not limited to, methanol, ethanol, propanol, isopropyl alcohol, tert-butyl alcohol, sec-butyl alcohol, butyl alcohol, tert-amyl alcohol or combinations thereof. Organic solvents include, but are not limited to, methyl ethyl ketone, acetone, lower alkyl cellosolves, lower alkyl carbitols or combinations thereof.

Manufacture of the Hydrocarbon Recovery Composition

The primary alcohols may be propoxylated by reacting them with propylene oxide in the presence of an appropriate alkoxylation catalyst. The alkoxylation catalyst may be a lanthanum-based or a rare earth metal-based alkoxylation catalyst as described in U.S. Pat. Nos. 5,059,719 and 5,057,627, both of which are herein incorporated by reference in their entirety.

Narrow range primary alcohol propoxylates may be produced utilizing a soluble basic compound of elements in the lanthanum series elements or the rare earth elements as the alkoxylation catalyst. Lanthanum phosphate is particularly useful. The propoxylation is carried out employing conventional reaction conditions such as those described above. The propoxylated composition which comprises the propoxylated alcohol and from about 1 to about 30 wt %, preferably from about 10 to about 20 wt %, most preferably about 13 to about 17 wt %, of polypropylene glycol, is made according this process.

As the terminology is used herein, the "rare earth" elements are those of atomic numbers 39 and 57 through 71, elements of the "lanthanum series" are those of atomic numbers 57 through 71; the "lanthanide" elements are those of atomic numbers 58 through 71. Traditionally, the lanthanum series has further been divided into the "cerium earth" group of atomic numbers 57 through 62, the "terbium earth" group of atomic numbers 63 through 66, and the "yttrium earth" group of atomic numbers 67 through 71 (so named not because yttrium is a member of the group, but because yttrium is found with these elements in nature).

In general terms, the catalyst for the process of the invention comprises one or more of the phosphate salts of the rare earth metals. In one preferred embodiment, the catalyst comprises one or more of the phosphate salts of the lanthanum series elements. In another embodiment, the catalyst comprises one or more of the phosphate salts of the lanthanide elements. In a further specific embodiment, the catalyst comprises one or more of the phosphate salts of the elements of the cerium earth group. In still another specific embodiment, the catalyst comprises a mixture of rare earth metal phosphate salts wherein the distribution of the rare earth elements substantially corresponds to that of a naturally occurring rare earth ore, for example, monazite, bastnasite, xenotime, gadolinite or euxenite.

The rare earth salt useful to produce the fluid rare earth phosphate catalysts are preferably soluble in the branched primary mono-hydric alkanol at a temperature of less than 120° C. Such rare earth salts can be, for example, halides, nitrates, carbonates or carboxylates of the rare earth elements. Carbonates are particularly preferred as described in U.S. Pat. No. 6,953,766. Some examples of other salts include bromides, chlorides, nitrates, acetates, and octoates.

The rare earth salt may be dissolved in the branched primary alcohol at temperatures in the range of ambient temperature up to 120° C. to provide a rare earth/organic solution. The rare earth salt may optionally be dissolved in water prior to addition to the organic compound, or preferably alkanol, to dissolve the rare earth salt faster. However, this is not necessary, and it is preferably desirable to have as little water as possible in the rare earth/alkanol solution.

To this rare earth/organic solution, phosphoric acid may be added slowly in a rare earth to phosphoric acid molar ratio in the range of from 0.7:1, more preferably from 0.9:1, to 1.3:1, more preferably from 1.1:1 to produce the fluid rare earth phosphate catalyst composition. The phosphoric acid may be in any form including concentrated form or in an aqueous solution. The concentration is preferably in the range of 50 percent to 80 percent by weight in aqueous solution.

The fluid rare earth phosphate catalyst may be optionally treated with a base in an amount to bring the pH of the catalyst composition in the range of 5-8 as long as the base does not interfere with the alkoxylation reaction. Such base typically does not contain a Group 1 or Group 2 elements of the Periodic Table, such as $Na^+$, $K^+$, $Cs^+$, $Ba^+$, $Mg^+$, $Ca^+$, etc. Ammonium hydroxide is particularly preferred.

The one or more of the phosphate salts of the rare earth elements may be present in the reaction mixtures in a catalytically effective amount, i.e., an amount sufficient to promote the propoxylation reaction or influence the propylene oxide adduct distribution of the product. Although a specific quantity of catalyst is not critical to the invention, preference may be expressed for use of the catalyst in an amount of at least about 0.01 percent by weight (% w), while an amount between about 0.02 and 5% w is considered more preferred and an amount between about 0.1 and 2% w is considered most preferred for typical embodiments. These percentages are in terms of the weight of rare earth metal ions in the process mixture relative to the weight of active hydrogen containing compounds in that mixture. Substantially greater quantities of catalyst, e.g., up to about 10% w or more, are also very suitable. As a rule, the higher the desired average propylene oxide adduct number of the alkoxylate product and the higher the desired rate of reaction, the greater the required quantity of catalyst.

In the process to prepare the catalyst according to the invention, the branched primary alcohol may be the reactant in the alkoxylation reaction. Thus, the active rare earth catalyst may be produced "in-situ" of one of the reactants.

It should be understood that the propoxylation procedure serves to introduce a desired average number of propylene oxide units per mole of primary alcohol propoxylate. For example, treatment of a primary alcohol mixture with 1.5 moles of propylene oxide per mole of primary alcohol serves to effect the propoxylation of each alcohol molecule with an average of 1.5 propylene oxide moieties per mole of primary alcohol moiety, although a substantial proportion of primary alcohol moieties will have become combined with more than 1.5 propylene oxide moieties and an approximately equal proportion will have become combined with less than 1.5. In a typical propoxylation product mixture, there is also a minor proportion of unreacted primary alcohol.

The amount of propylene glycol (PPG) which is produced during the propoxylation process may be adjusted by the amount of other compounds present in the reaction. For example, increasing the amount of water will increase the amount of PPG produced. The amount of PPG produced may also be affected by the treatment of the LAPO catalyst before addition. For example, heating the catalyst before use will lower the amount of PPG produced.

In the preparation of the glycerol sulfonates derived from the alkoxylated primary alcohols of the present invention, the alkoxylates are reacted with epichlorohydrin, preferably in the presence of a catalyst such as tin tetrachloride at from about 110 to about 120° C. for from about 3 to about 5 hours at a pressure of about 14.7 to about 15.7 psia (about 100 to about 110 kPa) in toluene. Next, the reaction product is reacted with a base such as sodium hydroxide or potassium hydroxide at from about 85 to about 95° C. for from about 2 to about 4 hours at a pressure of about 14.7 to about 15.7 psia (about 100 to about 110 kPa). The reaction mixture is cooled and separated in two layers. The organic layer is separated and the product isolated. It is then reacted with sodium bisulfite and sodium sulfite at from about 140 to about 160° C. for from about 3 to about 5 hours at a pressure of about 60 to about 80 psia (about 400 to about 550 kPa). The reaction is cooled and the product glycerol sulfonate is recovered as about a 25 wt % active matter solution in water. The reactor is preferably a 500 ml zipperclave reactor.

Injection of the Hydrocarbon Recovery Composition

The hydrocarbon recovery composition may interact with hydrocarbons in at least a portion of the hydrocarbon containing formation. Interaction with the hydrocarbons may reduce an interfacial tension of the hydrocarbons with one or more fluids in the hydrocarbon containing formation. In other embodiments, a hydrocarbon recovery composition may reduce the interfacial tension between the hydrocarbons and an overburden/underburden of a hydrocarbon containing formation. Reduction of the interfacial tension may allow at least a portion of the hydrocarbons to mobilize through the hydrocarbon containing formation.

The ability of a hydrocarbon recovery composition to reduce the interfacial tension of a mixture of hydrocarbons and fluids may be evaluated using known techniques. In an embodiment, an interfacial tension value for a mixture of hydrocarbons and water may be determined using a spinning drop tensiometer. An amount of the hydrocarbon recovery composition may be added to the hydrocarbon/water mixture and an interfacial tension value for the resulting fluid may be determined. A low interfacial tension value (e.g., less than about 1 dyne/cm) may indicate that the composition reduced at least a portion of the surface energy between the hydrocarbons and water. Reduction of surface energy may indicate that at least a portion of the hydrocarbon/water mixture may mobilize through at least a portion of a hydrocarbon containing formation.

In an embodiment, a hydrocarbon recovery composition may be added to a hydrocarbon/water mixture and the interfacial tension value may be determined. An ultralow interfacial tension value (e.g., less than about 0.01 dyne/cm) may indicate that the hydrocarbon recovery composition lowered at least a portion of the surface tension between the hydrocarbons and water such that at least a portion of the hydrocarbons may mobilize through at least a portion of the hydrocarbon containing formation. At least a portion of the hydrocarbons may mobilize more easily through at least a portion of the hydrocarbon containing formation at an ultra low interfacial tension than hydrocarbons that have been treated with a composition that results in an interfacial tension value greater than 0.01 dynes/cm for the fluids in the formation. Addition of a hydrocarbon recovery composition to fluids in a hydrocarbon containing formation that results in an ultra-low interfacial tension value may increase the efficiency at which hydrocarbons may be produced. A hydrocarbon recovery composition concentration in the hydrocarbon containing formation may be minimized to minimize cost of use during production.

In an embodiment of a method to treat a hydrocarbon containing formation, a hydrocarbon recovery composition including a glycerol sulfonate of a propoxylated branched primary alcohol of this invention may be provided (e.g., injected) into hydrocarbon containing formation 100 through injection well 110 as depicted in FIG. 1. Hydrocarbon formation 100 may include overburden 120, hydrocarbon layer 130, and underburden 140. Injection well 110 may include openings 112 that allow fluids to flow through hydrocarbon containing formation 100 at various depth levels. In certain embodiments, hydrocarbon layer 130 may be less than 1000 feet below earth's surface. In some embodiments, underburden 140 of hydrocarbon containing formation 100 may be oil wet. Low salinity water may be present in hydrocarbon containing formation 100, in other embodiments.

A hydrocarbon recovery composition may be provided to the formation in an amount based on hydrocarbons present in a hydrocarbon containing formation. The amount of hydrocarbon recovery composition, however, may be too small to be accurately delivered to the hydrocarbon containing formation using known delivery techniques (e.g., pumps). To facilitate delivery of small amounts of the hydrocarbon recovery composition to the hydrocarbon containing formation, the hydrocarbon recovery composition may be combined with water and/or brine to produce an injectable fluid. An amount of a hydrocarbon recovery composition injected into hydrocarbon containing formation 100 may be from about 0.1 to about 4 wt. % of the total weight of the injectable fluid. In certain embodiments, an amount of the propoxylated composition (the active matter) which is part of the hydrocarbon recovery composition provided to a hydrocarbon containing formation may be from about 0.1 to about 1 wt. % of the total weight of injectable fluid. In some embodiments, an amount of a hydrocarbon recovery composition provided to a hydrocarbon containing formation may be from about 0.2 to about 0.5 wt. % of the total weight of injectable fluid.

The hydrocarbon recovery composition may interact with at least a portion of the hydrocarbons in hydrocarbon layer 130. The interaction of the hydrocarbon recovery composition with hydrocarbon layer 130 may reduce at least a portion of the interfacial tension between different hydrocarbons. The hydrocarbon recovery composition may also reduce at least a portion of the interfacial tension between one or more fluids (e.g., water, hydrocarbons) in the formation and the underburden 140, one or more fluids in the formation and the overburden 120 or combinations thereof.

In an embodiment, a hydrocarbon recovery composition may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. An interfacial tension value between the hydrocarbons and one or more fluids may be altered by the hydrocarbon recovery composition to a value of less than about 0.1 dyne/cm. In some embodiments, an interfacial tension value between the hydrocarbons and other fluids in a formation may be reduced by the hydrocarbon recovery composition to be less than about 0.05 dyne/cm. An interfacial tension value between hydrocarbons and other fluids in a formation may be lowered by the hydrocarbon recovery composition to less than 0.001 dyne/cm, in other embodiments.

At least a portion of the hydrocarbon recovery composition/hydrocarbon/fluids mixture may be mobilized to production well 150. Products obtained from the production well 150 may include, but are not limited to, components of the hydrocarbon recovery composition (e.g., a long chain aliphatic alcohol and/or a long chain aliphatic acid salt), methane, carbon monoxide, water, hydrocarbons, ammonia, asphaltenes, or combinations thereof. Hydrocarbon production from hydrocarbon containing formation 100 may be increased by greater than about 50% after the hydrocarbon recovery composition has been added to a hydrocarbon containing formation.

In certain embodiments, hydrocarbon containing formation 100 may be pretreated with a hydrocarbon removal fluid. A hydrocarbon removal fluid may be composed of water, steam, brine, gas, liquid polymers, foam polymers, monomers or mixtures thereof. A hydrocarbon removal fluid may be used to treat a formation before a hydrocarbon recovery composition is provided to the formation. Hydrocarbon containing formation 100 may be less than 1000 feet below the earth's surface, in some embodiments. A hydrocarbon removal fluid may be heated before injection into a hydrocarbon containing formation 100, in certain embodiments. A hydrocarbon removal fluid may reduce a viscosity of at least a portion of the hydrocarbons within the formation. Reduction of the viscosity of at least a portion of the hydrocarbons in the formation may enhance mobilization of at least a portion of the hydrocarbons to production well 150. After at least a portion of the hydrocarbons in hydrocarbon containing formation 100 have been mobilized, repeated injection of the same or different hydrocarbon removal fluids may become less effective in mobilizing hydrocarbons through the hydrocarbon containing formation. Low efficiency of mobilization may be due to hydrocarbon removal fluids creating more permeable zones in hydrocarbon containing formation 100. Hydrocarbon removal fluids may pass through the permeable zones in the hydrocarbon containing formation 100 and not interact with and mobilize the remaining hydrocarbons. Consequently, displacement of heavier hydrocarbons adsorbed to underburden 140 may be reduced over time. Eventually, the formation may be considered low producing or economically undesirable to produce hydrocarbons.

In certain embodiments, injection of a hydrocarbon recovery composition after treating the hydrocarbon containing formation with a hydrocarbon removal fluid may enhance mobilization of heavier hydrocarbons absorbed to underburden 140. The hydrocarbon recovery composition may interact with the hydrocarbons to reduce an interfacial tension between the hydrocarbons and underburden 140. Reduction of the interfacial tension may be such that hydrocarbons are mobilized to and produced from production well 150. Produced hydrocarbons from production well 150 may include, in some embodiments, at least a portion of the components of the hydrocarbon recovery composition, the hydrocarbon removal fluid injected into the well for pretreatment, methane, carbon dioxide, ammonia, or combinations thereof. Adding the hydrocarbon recovery composition to at least a portion of a low producing hydrocarbon containing formation may extend the production life of the hydrocarbon containing formation. Hydrocarbon production from hydrocarbon containing formation 100 may be increased by greater than about 50% after the hydrocarbon recovery composition has been added to hydrocarbon containing formation. Increased hydrocarbon production may increase the economic viability of the hydrocarbon containing formation.

Interaction of the hydrocarbon recovery composition with at least a portion of hydrocarbons in the formation may reduce at least a portion of an interfacial tension between the hydrocarbons and underburden 140. Reduction of at least a portion of the interfacial tension may mobilize at least a portion of hydrocarbons through hydrocarbon containing formation 100. Mobilization of at least a portion of hydrocarbons, however, may not be at an economically viable rate.

In one embodiment, polymers may be injected into hydrocarbon formation 100 through injection well 110, after treatment of the formation with a hydrocarbon recovery composition, to increase mobilization of at least a portion of the hydrocarbons through the formation. Suitable polymers include, but are not limited to, CIBA® ALCOFLOOD®, manufactured by Ciba Specialty Additives (Tarrytown, N.Y.), Tramfloc® manufactured by Tramfloc Inc. (Temple, Ariz.), and HE® polymers manufactured by Chevron Phillips Chemical Co. (The Woodlands, Tex.). Interaction between the hydrocarbons, the hydrocarbon recovery composition and the polymer may increase mobilization of at least a portion of the hydrocarbons remaining in the formation to production well 150.

The propoxylated branched primary alcohol glycerol sulfonate component of the composition is thermally stable and may be used over a wide range of temperature. In some embodiments, a hydrocarbon recovery composition may be added to a portion of a hydrocarbon containing formation 100 that has an average temperature of from 0 to 150° C. because of the high thermal stability of the glycerol sulfonate.

Figure 2:
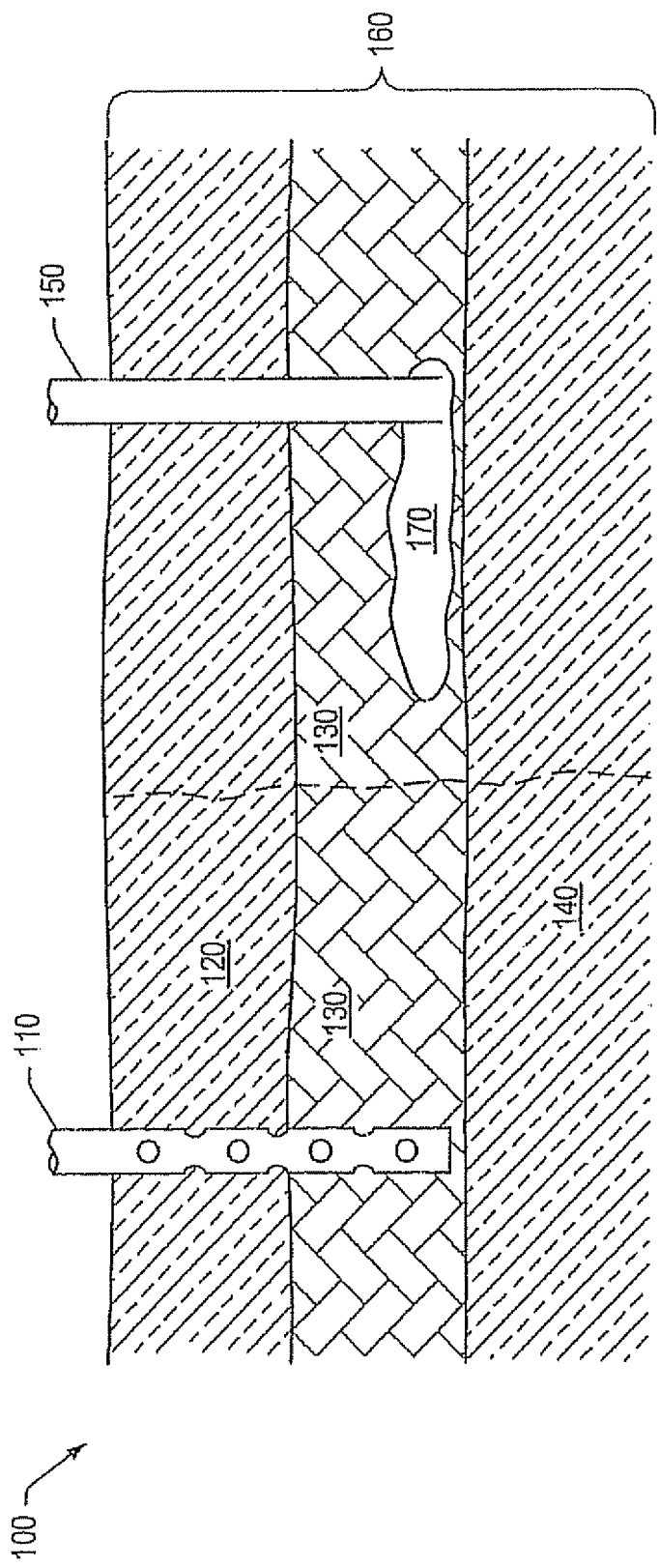
FIG. 2 depicts an embodiment of treating a hydrocarbon containing formation.

In some embodiments, the hydrocarbon recovery composition may be injected into hydrocarbon containing formation 100 through injection well 110 as depicted in FIG. 2. Interaction of the hydrocarbon recovery composition with hydrocarbons in the formation may reduce at least a portion of an interfacial tension between the hydrocarbons and underburden 140. Reduction of at least a portion of the interfacial tension may mobilize at least a portion of hydrocarbons to a selected section 160 in hydrocarbon containing formation 100 to form hydrocarbon pool 170. At least a portion of the hydrocarbons may be produced from hydrocarbon pool 170 in the selected section of hydrocarbon containing formation 100.

In other embodiments, mobilization of at least a portion of hydrocarbons to selected section 160 may not be at an economically viable rate. Polymers may be injected into hydrocarbon formation 100 to increase mobilization of at least a portion of the hydrocarbons through the formation. Interaction between at least a portion of the hydrocarbons, the hydrocarbon recovery composition and the polymers may increase mobilization of at least a portion of the hydrocarbons to production well 150.

In some embodiments, a hydrocarbon recovery composition may include an inorganic salt (e.g. sodium carbonate ($Na_2CO_3$), sodium chloride (NaCl), or calcium chloride ($CaCl_2$)). The addition of the inorganic salt may help the hydrocarbon recovery composition disperse throughout a hydrocarbon/water mixture. The enhanced dispersion of the hydrocarbon recovery composition may decrease the interactions between the hydrocarbon and water interface. The decreased interaction may lower the interfacial tension of the mixture and provide a fluid that is more mobile.

EXAMPLES

Example 1

Neodol 67 branched primary alcohol (carbon number 16-17, average number of branches per aliphatic group 1.5) was dried over 4A molecular sieves. The alcohol was further purged with Nitrogen at 120° C. while stirring for 1 hr in a round bottom flask equipped with over head stirrer, reflux condenser thermocouple and Dean Stark trap.

The alcohol was kept under nitrogen until loaded into a clean autoclave with a lanthanum phosphate (LAPO). LAPO was charged at the rate of 0.5 g/150 g of starting alcohol. The reaction was run with 1073 g of Neodol 67 alcohol, 3.611 g of LAPO and 1333 g of propylene oxide (PO) to make a 7 mole PO per molecule of Neodol 67 alcohol. The autoclave was sealed and purge with nitrogen to create a nitrogen atmosphere. The starting nitrogen was 30 psi (200 kPa) at 160° C. The propylene oxide was charged in using a dome regulator to control flow. The actual temperature was between 159° C. to 172° C. and pressure is 30 psi (200 kPa) to 160 psi (1100 kPa). PO was added over the course of 180 minutes and the reaction was allowed to soak for 30 minutes after the addition of PO was complete. The reactor contents were then discharged and collected.

Using the Zn/Co dimetal catalyst (DMC) catalyst, the procedure was the same as for the LAPO catalyst. The only difference was that a 1% suspension of the DMC catalyst in PPG400 (PPG400-400 number average molecular weight) was purchased from Bayer and used as delivered. The concentration of DMC catalyst in the final mixture was about 50 ppm.

After the starting alcohol is alkoxylated, the material is cooled to 25° C. and pumped into a thin film reactor. The material flows down the sides and is kept at 25° C. A dilute stream of $SO_3$ in nitrogen is introduced at the top and flows down the reactor with the liquid. The reaction occurs in the liquid as the $SO_3$ gas is absorbed into the liquid. The sulfate acid product is collected continuously at the outlet or the reactor into a solution of 25 wt % sodium hydroxide solution, yielding the sodium salt of the surfactant.

Figure 3:
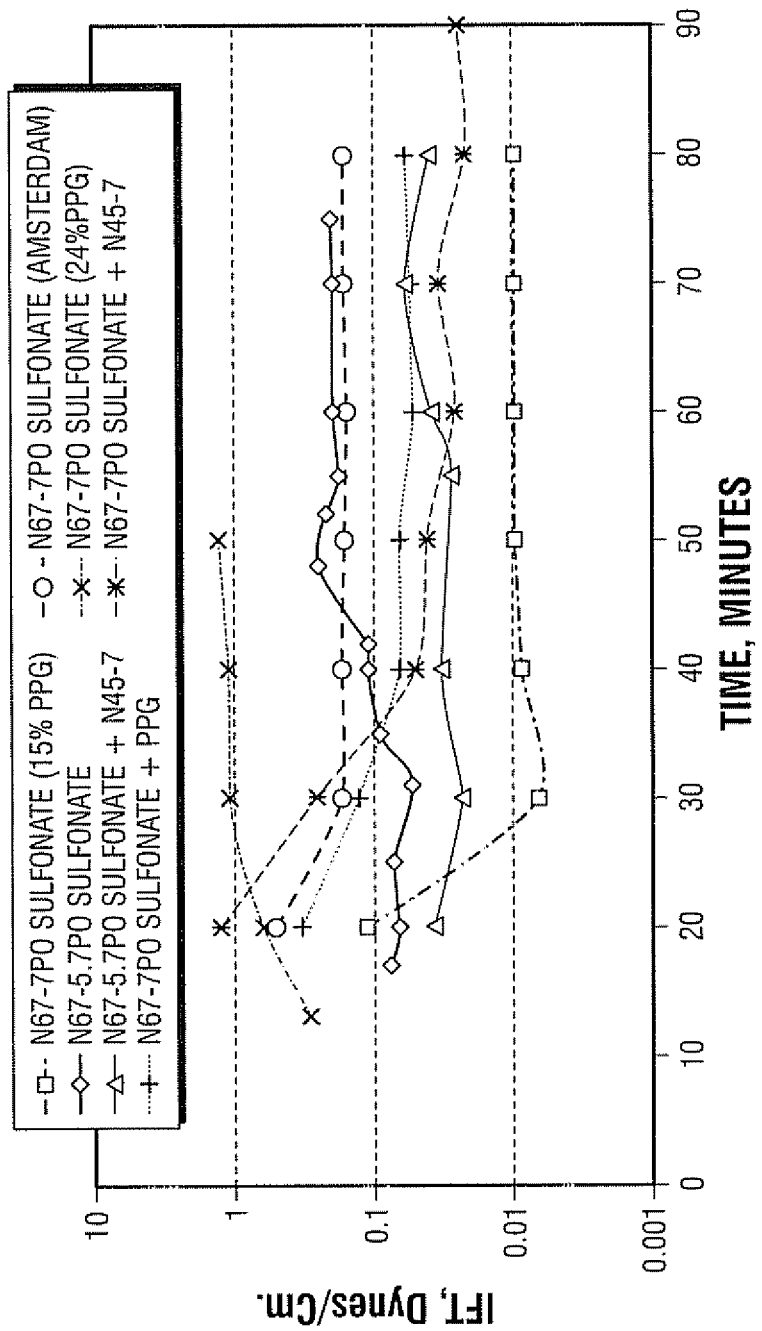
FIG. 3 depicts a graphical representation of interfacial tension values of a hydrocarbon composition containing glycerol sulfonates according to the present invention.

Interfacial tensions (IFT's) were measured for a North Sea crude oil with 3.1% Seawater Brine at 72° C. The first sample used was a NEODOL 67 alcohol (N67) propoxylated (with 7 PO groups per molecule) glycerol sulfonate (N67-7PO-Glycerol Sulfonate) made using (DMC). The material had about 1-2% polypropylene glycol (PPG-PPG400-400 number average molecular weight) and gave IFT's between 0.1 and 0.3 dynes/centimeter (blue circle in FIG. 3). Upon replacing the DMC with a lanthanum phosphate (LaPO) catalyst, we found that much more of the propylene oxide (PO) polymerizes into PPG during the reaction. Upon washing out the PPG from this sample, we were left with a N67-5.7PO-Glycerol Sulfonate. The material had 0% PPG in it and gave similar IFT values (to those of the above DMC N67-7PO-Glycerol Sulfonate) of between 0.1 and 0.3 dynes/centimeter for times greater than 40 minutes (red diamonds in FIG. 3). The results are shown in FIG. 3.

Each of these two samples were mixed with a solubilizer to improve their performance. When the ethoxylated NEODOL 45 alcohol (N45-7) solubilizer was mixed in, the IFT measurements for each sample improved and dropped to between 0.05 and 0.08 dynes/centimeter (DMC—yellow star & LAPO—green triangle in FIG. 3). A sample of DMC N67-7PO-GS was mixed with polypropylene glycol (PPG400-400 number average molecular weight) as the enhancing agent. The resulting IFT measurements of 0.05 to 0.08 dynes/centimeter (red squares) were about the same as those using the N45-7 solubilizing agent. Two samples were made with in situ PPG, one with about 24% wt PPG and one with about 15% wt PPG. The sample with 24% wt PPG gave a high IFT, about 1 (orange cross), and the sample with 15% wt PPG gave a much lower IFT, less than 0.01 (purple square). Therefore, our conclusion was that in situ production of about 15% wt PPG is a better EOR surfactant for this oil than the product DMC N67-7PO-GS made without PPG or with added PPG enhancer or N45-7 solubulizer.

Interfacial tension values for the hydrocarbon/hydrocarbon recovery composition/water mixtures were determined using a University of Texas model spinning drop tensiometer. A four microliter (μL) drop of n-dodecane hydrocarbon was placed into a glass capillary tube that contained a hydrocarbon recovery composition/brine solution to provide a brine-to-hydrocarbon volume ratio of 400. The tube was placed into a spinning drop apparatus and then capped. The motor was turned on rapidly to rotate the tube to create a cylindrical drop within the tube (e.g. 6 to 12 ms/rev). The drop length may be greater than or equal to 4 times the width of a drop. The capillary tube and drop were heated to various temperatures (at and above 25, 50, 75 and 98° C.). The drop was video taped for later replay for measurement of the drop dimensions and calculation of the interfacial tension between the drop and the composition/brine using an Optima® System. The time range of the measurements was from about 0.1 to about 1.0 hours to achieve drop equilibrium.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope o the invention as described in the following claims. In addition, it is to be understood that features described herein independently may, in certain embodiments, be combined.

What is claimed is:

1. A method of treating a hydrocarbon containing formation, comprising:
   (a) providing a hydrocarbon recovery composition to at least a portion of the hydrocarbon containing formation, wherein the hydrocarbon recovery composition comprises a propoxylated composition which comprises (1) a glycerol sulfonate of a propoxylated primary alcohol having a branched aliphatic group with an average carbon number from 10 to 24 and having an average number of branches per aliphatic group of from 0.7 to 2.5 and having at least 0.5 moles of propylene oxide per mole of primary alcohol and (2) polypropylene glycol; provided that the primary alcohol is propoxylated by contacting the alcohol with propylene oxide in the presence of a catalytically effective amount of one or more of phosphate salts of lanthanum series elements or the rare earth elements, wherein the propoxylated composition comprising the propoxylated alcohol and from 1 to 30 wt % of polypropylene glycol is produced; and
   (b) allowing the hydrocarbon recovery composition to interact with hydrocarbons in the hydrocarbon containing formation.

2. The method of claim 1 wherein the branched aliphatic group of the propoxylated primary alcohol has an average number of branches per aliphatic group of from about 1.4 to about 2.

3. The method claim 1 wherein the amount of polypropylene glycol formed with the propoxylated alcohol is from 10 to 20 wt %.

4. The method of claim 1 wherein the propoxylated primary alcohol has an average of from about 5 to about 9 propylene oxide groups per molecule.

5. The method of claim 1 wherein the branched aliphatic group of the propoxylated primary alcohol has an average carbon number from 14 to 20.

6. The method of claim 1 wherein the hydrocarbon recovery composition is admixed with water and/or brine to form an injectable fluid which is injected into the hydrocarbon containing formation and the propoxylated composition comprises from 0.1 to 1 wt % of the injectable fluid.

7. The method of claim 6 wherein the propoxylated composition comprises from 0.2 to 0.5 wt % of the injectable fluid.

8. The method of claim 1 wherein the propoxylated composition comprises from 10 to 80 wt % of the composition.

9. The method of claim 1 wherein the branched aliphatic group of the propoxylated primary alcohol has an average carbon number from 16 to 19.

10. The method of claim 9 wherein the branched aliphatic group of the propoxylated primary alcohol has an average carbon number from 16 to 17.

11. A hydrocarbon recovery composition comprising a propoxylated composition which comprises (1) a glycerol sulfonate of a propoxylated primary alcohol having a branched aliphatic group with an average carbon number from 10 to 24 and having an average number of branches per aliphatic group of from 0.7 to 2.5 and having at least 0.5 moles of propylene oxide per mole of primary alcohol and (2) polypropylene glycol; provided that the primary alcohol is propoxylated by contacting the alcohol with propylene oxide in the presence of a catalytically effective amount of one or more of phosphate salts of lanthanum series elements or the rare earth elements, wherein the propoxylated composition comprising the propoxylated alcohol and from 10 to 30 wt % of polypropylene glycol is produced.

12. The composition of claim 11 wherein the branched aliphatic group of the propoxylated primary alcohol has an average number of branches per aliphatic group of from 1.4 to 2.

13. The composition of claim 11 wherein the propoxylated primary alcohol has an average of from 5 to 9 propylene oxide groups per molecule.

14. The composition of claim 11 wherein the amount of polypropylene glycol formed with the propoxylated alcohol is from 10 to 20 wt %.

15. The composition of claim 11 wherein the branched aliphatic group of the propoxylated primary alcohol has an average carbon number from 14 to 20.

* * * * *